(12) United States Patent
Darland

(10) Patent No.: US 10,702,011 B2
(45) Date of Patent: Jul. 7, 2020

(54) SELECTIVELY APPLIED ADHESIVE PARTICULATE ON NONMETALLIC SUBSTRATES

(71) Applicant: NIKE, Inc., Beaverton, OR (US)

(72) Inventor: Jeff Darland, Tigard, OR (US)

(73) Assignee: NIKE, INC., Beaverton, OR (US)

( * ) Notice: Subject to any disclaimer, the term of this patent is extended or adjusted under 35 U.S.C. 154(b) by 150 days.

(21) Appl. No.: 15/935,743

(22) Filed: Mar. 26, 2018

(65) Prior Publication Data
US 2018/0213885 A1    Aug. 2, 2018

Related U.S. Application Data

(62) Division of application No. 14/248,818, filed on Apr. 9, 2014, now Pat. No. 10,004,292.

(51) Int. Cl.
*A43B 9/12* (2006.01)
*C09J 131/04* (2006.01)
(Continued)

(52) U.S. Cl.
CPC ............... *A43B 9/12* (2013.01); *A43B 13/32* (2013.01); *A43D 25/183* (2013.01); *A43D 25/20* (2013.01); *B29C 64/153* (2017.08); *C09J 5/02* (2013.01); *C09J 5/06* (2013.01); *C09J 123/02* (2013.01); *C09J 131/04* (2013.01); *C09J 175/04* (2013.01); *A43D 2200/60* (2013.01); *B29K 2105/0097* (2013.01); *B29K 2105/24* (2013.01); *B29K 2223/083* (2013.01); *B29K 2275/00* (2013.01);
(Continued)

(58) Field of Classification Search
CPC ..................................................... A43B 13/32

USPC ...................................................... 428/195.1
See application file for complete search history.

(56) References Cited

U.S. PATENT DOCUMENTS 4,246,380 A    1/1981  Gras et al.
5,393,482 A    2/1995  Benda et al.
(Continued)

FOREIGN PATENT DOCUMENTS

DE    4434917 C1    2/1966
EP    1852242 A1    11/2007
(Continued)

OTHER PUBLICATIONS

Final Office Action dated Oct. 30, 2018 in U.S. Appl. No. 15/623,610, 21 pages.
(Continued)

*Primary Examiner* — Ian A Rummel
(74) *Attorney, Agent, or Firm* — Shook, Hardy & Bacon L.L.P.

(57) ABSTRACT

The manufacturing of articles relies on the bonding of two or more components to form some forms of the articles, such as a shoe sole bonded with a shoe upper. The bonding may be achieved with an adhesive particulate that is applied to a surface of a substrate. The adhesive particulate is selectively fused to the substrate with a controlled energy source, such as a laser. The selective application of laser energy allows for specific geometric structures of adhesive particulate to be formed on the substrate. The substrate having the fused adhesive particulate is mated with another component allowing the fused adhesive particulate to bond the first substrate and the second component.

15 Claims, 7 Drawing Sheets

(51) Int. Cl.

| | | |
|---|---|---|
| *C09J 175/04* | (2006.01) | |
| *B29C 64/153* | (2017.01) | |
| *A43B 13/32* | (2006.01) | |
| *C09J 123/02* | (2006.01) | |
| *A43D 25/20* | (2006.01) | |
| *C09J 5/02* | (2006.01) | |
| *A43D 25/18* | (2006.01) | |
| *B33Y 80/00* | (2015.01) | |
| *B33Y 70/00* | (2020.01) | |
| *B33Y 10/00* | (2015.01) | |
| *C09J 5/06* | (2006.01) | |
| *B29K 105/24* | (2006.01) | |
| *B29K 105/00* | (2006.01) | |
| *B29K 275/00* | (2006.01) | |
| *B29K 223/00* | (2006.01) | |

(52) U.S. Cl.
CPC .............. *B33Y 10/00* (2014.12); *B33Y 70/00* (2014.12); *B33Y 80/00* (2014.12); *C09J 2201/28* (2013.01); *C09J 2205/114* (2013.01); *C09J 2205/31* (2013.01); *C09J 2423/00* (2013.01); *C09J 2423/04* (2013.01); *C09J 2431/00* (2013.01); *C09J 2475/00* (2013.01)

(56) References Cited

U.S. PATENT DOCUMENTS

| | | |
|---|---|---|
| 6,114,682 A | 9/2000 | Minakuchi et al. |
| 6,509,128 B1 | 1/2003 | Everaerts et al. |
| 6,784,227 B2 | 8/2004 | Simon et al. |
| 7,220,334 B2 | 5/2007 | Anazawa et al. |
| 8,505,477 B2 | 8/2013 | Makover et al. |
| 9,707,727 B2 | 7/2017 | Darland |
| 2002/0042455 A1 | 4/2002 | Simon et al. |
| 2002/0075917 A1 | 6/2002 | Suda |
| 2002/0092199 A1 | 7/2002 | Fish et al. |
| 2003/0052105 A1 | 3/2003 | Nagano et al. |
| 2003/0175162 A1 | 9/2003 | Anazawa et al. |
| 2004/0074089 A1 | 4/2004 | Gilleo |
| 2004/0118018 A1 | 6/2004 | Dua |
| 2004/0265504 A1 | 12/2004 | Magnin et al. |
| 2005/0061435 A1 | 3/2005 | Everaerts et al. |
| 2007/0179208 A1* | 8/2007 | Schutte .............. C08G 18/4238 521/99 |
| 2009/0064535 A1 | 3/2009 | Spanks et al. |
| 2009/0126225 A1 | 5/2009 | Jarvis |
| 2009/0208759 A1 | 8/2009 | Kanagawa et al. |
| 2010/0021630 A1 | 1/2010 | Makover et al. |
| 2010/0095557 A1 | 4/2010 | Jarvis |
| 2010/0209615 A1 | 8/2010 | Makover et al. |
| 2012/0272899 A1 | 11/2012 | Makover et al. |
| 2013/0089677 A1 | 4/2013 | Makover et al. |
| 2014/0027039 A1 | 1/2014 | Czaplicki et al. |
| 2014/0059886 A1 | 3/2014 | Lyttle et al. |
| 2015/0290877 A1 | 10/2015 | Darland |
| 2015/0290893 A1 | 10/2015 | Darland |

FOREIGN PATENT DOCUMENTS

| | | |
|---|---|---|
| JP | 2004-94144 A | 3/2004 |
| WO | 02601011 A1 | 8/2002 |
| WO | 2012048979 A1 | 3/2012 |
| WO | 2012078826 A2 | 6/2012 |

OTHER PUBLICATIONS

Extended European Search Report dated Jul. 16, 2018 in European Application No. 18168484.6, 5 pages.
Non-Final Office Action dated Jun. 27, 2018 in U.S. Appl. No. 15/623,610, 20 pages.
Non-Final Office Action dated Jun. 26, 2019 in U.S. Appl. No. 15/623,610, 21 pages.
Non-Final Office Action dated Nov. 13, 2019 in U.S. Appl. No. 15/623,610, 22 pages.
Intention to Grant received for European Patent Application No. 16724196.7, dated Jan. 27, 2020, 6 pages.
Non-Final Office Action received for U.S. Appl. No. 15/623,610, dated Mar. 9, 2020, 19 pages.

* cited by examiner

SELECTIVELY APPLIED ADHESIVE PARTICULATE ON NONMETALLIC SUBSTRATES

CROSS-REFERENCE TO RELATED APPLICATIONS

This application is a divisional application of pending U.S. application Ser. No. 14/248,818, filed Apr. 9, 2014, and entitled "Selectively Applied Adhesive Particulate on Nonmetallic Substrates." The entirety of the aforementioned application is incorporated by reference herein.

STATEMENT REGARDING FEDERALLY SPONSORED RESEARCH OR DEVELOPMENT

Not applicable.

TECHNICAL FIELD

The aspects hereof relate to an adhesive application technique using energy applied to an adhesive particulate to selectively fuse the adhesive particulate to a substrate for eventual use as an adhesive with another component.

BACKGROUND

Components may be coupled together using a variety of technique. For example, an adhesive may be applied to at least one surface of a first substrate (e.g., material) that is intended to be bonded with another substrate. The adhesive may bond the two substrates through physical and/or chemical bonds. The bonding of two substrates with an adhesive may be used in any industry. For example, the bonding of two substrates extends into the aviation, automotive, nautical, industrial goods, consumer goods, apparel, and footwear industries, for example.

An exemplary article of footwear, such as a shoe, is described for background purposes. A typical shoe comprises an upper and a sole structure. The sole structure, in turn, may comprise a midsole and an outsole. While a separate midsole and outsole are discussed, it is contemplated that the sole structure may be formed such that the midsole and the outsole are merely regions of a commonly formed structure. For reference purposes, an exemplary shoe may be divided into three general regions or areas: a forefoot or toe region, a midfoot region, and a heel region. The shoe also comprises a lateral side and a medial side. The lateral side generally extends along a lateral side of a user's foot when in an as-worn configuration. The medial side extends along a medial side of the user's foot when in an as-worn configuration. The lateral side and the medial side are not intended to demarcate specific areas of the shoe. Instead, they are intended to represent general areas of the shoe that are used for reference purposes for the following discussion. For example, the medial side and the lateral side may converge near the toe region at respective sides of a toe box. Similarly, it is contemplated that the medial side and the lateral side may also converge at respective sides of an Achilles reinforcement proximate the heel region. Therefore, depending on the shoe design and construction, the terms medial, lateral, toe, heel, and the like generally refer to a proximate location and may not be limiting.

The upper portion of an article of footwear is generally secured to the sole structure and defines a cavity for receiving a foot. As mentioned above, the sole structure may comprise the outsole and the midsole. The outsole forms a ground-engaging surface of the sole structure. The midsole is generally positioned between the upper and the outsole. The outsole and/or the midsole may be formed of conventional materials, such as rubber, leather, or a polymer foam material (polyurethane or ethylene vinyl acetate, for example). The outsole may be integrally formed with the midsole, or the outsole may be attached to a lower surface of the midsole.

Traditional manufacturing techniques for constructing an article of footwear may rely on a brushing or applying of a liquid adhesive to a top surface of the sole structure (e.g., a top surface of a midsole portion) and/or a bottom surface of the upper portion. This application of adhesive may prove problematic as a sufficient amount of adhesive is needed to form a sufficient bond between the sole structure and the upper, but too much adhesive can add weight, cost, and potentially be visually undesirable.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects generally relate to adhesive particulate that is selectively fused on a component for an article of footwear, such that the selectively fused adhesive particulate may then subsequently be heated for use in bonding the component with another component. For example, a method of applying an adhesive particulate to an article of footwear component may include applying an adhesive particulate to a portion of the article of footwear component such that a laser selectively applies laser energy to the adhesive particulate and the footwear component to fuse the adhesive particulate and the footwear component selectively. This selective application of laser energy forms a fused portion of the adhesive particulate in a desired geometric pattern that is both effective at bonding components and an efficient use of the adhesive particulate. After selectively applying the laser energy, an unfused portion of the applied adhesive particulate is removed from the footwear component for potential use in a subsequent reapplication onto another component. Further, subsequent to removing the unfused portion of the applied adhesive particulate, thermal energy is applied to the fused adhesive particulate for bonding the footwear component with a second article of footwear component, in an exemplary aspect.

BRIEF DESCRIPTION OF THE SEVERAL VIEWS OF THE DRAWINGS

The present invention is described in detail below with reference to the attached drawing figures, wherein.

DETAILED DESCRIPTION

Aspects generally relate to adhesive particulate that is selectively fused on a substrate, such that the selectively fused adhesive particulate may then subsequently be heated for use in bonding the substrate with another component. For example, a method of applying an adhesive particulate to a substrate may include applying an adhesive particulate to a portion of the article of footwear component, such that a laser selectively applies laser energy to the adhesive particulate and the footwear component to fuse the adhesive particulate and the footwear component selectively. This selective application of laser energy forms a fused portion of the adhesive particulate in a desired geometric pattern that is both effective at bonding components/substrates and an efficient use of the adhesive particulate. After selectively applying the laser energy, an unfused portion of the applied adhesive particulate is removed from the substrate for potential use in a subsequent reapplication onto another component. Further, subsequent to removing the unfused portion of the applied adhesive particulate, thermal energy is applied to the fused adhesive particulate for bonding the substrate with a second substrate, in an exemplary aspect.

Aspects also provide for a component of an article of footwear, such as a sole portion. The component comprises a surface, such as a midsole foot-supporting surface or a midsole sidewall interior surface. The component is adapted, such as being formed or sized, to form at least a portion of an article of footwear. The component also has an adhesive particulate that is in a contacting relationship with the component surface. The adhesive particulate forms both a fused region and a second unfused region. The fused region is a result of selectively applied laser energy to the adhesive particulate to fuse the adhesive particulate, which forms the fused region into a specific geometric pattern on the component surface. The unfused region is a portion of the adhesive particulate to which thermal energy, such as the laser energy, was not applied sufficiently and therefore did not fuse. The adhesive particulate is fused with the component in the fused region, and the adhesive particulate is not fused with the component in the unfused region. The unfused region is substantially bounded by the fused region on the component surface. The geometric pattern formed by the fused region substantially forms a perimeter around the unfused region allowing for an adequate portion of the surface to have a fused region without requiring the entirety of the surface to have the fused region, in an exemplary aspect. Stated differently, by selectively applying the laser energy, it is possible to form fused regions that surround unfused regions of adhesive particulate.

Figure 1:
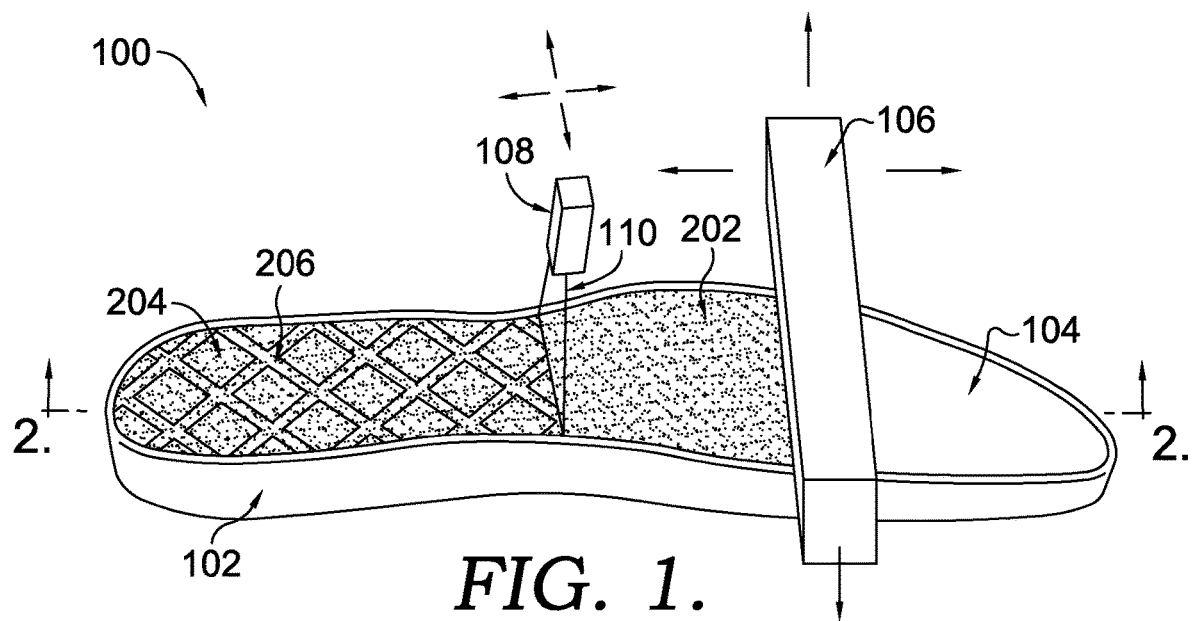
FIG. 1 depicts an exemplary process where a component for an article of footwear receives a selectively applied laser energy applied thereon to selectively fuse adhesive particulate, in accordance with aspects hereof.

FIG. 1 depicts an exemplary process 100 where a component 102 for an article of footwear receives a selective laser energy 110 applied thereon to selectively fuse adhesive particulate 202, in accordance with aspects hereof. An article of footwear is an article intended to be worn in connection with a user's foot. Examples of an article of footwear include, but are not limited to, boots, shoes, sandals, and the like. Therefore, it is contemplated that aspects provided herein may be applied to any article of footwear, such as shoes. While an article of footwear is discussed throughout this description, the concepts applied to article of footwear are exemplary in nature and intended for application, in some aspects, outside of footwear manufacturing. As provided in the Background, an article of footwear may be formed from a number of components, such as individual members and assemblies of members. For example, a sole may be a combination of a midsole and an outsole. Similarly, an upper may be a combination of materials forming the upper. Therefore, reference to a "component" contemplates both individual members as well as assemblies of members. In exemplary aspects, a component is a midsole portion of an article of footwear. Additionally, in an exemplary aspect, a component is an upper portion of an article of footwear. With this understanding, FIGS. 1-6 primarily depict a sole portion for illustrative purposes. However, it is contemplated that other components, such as an upper, may instead be applied to the various concepts provided herein and specifically discussed with respect to FIGS. 1-6.

The component 102, in this exemplary aspect, is a sole portion having a surface 104. The surface 104 is a foot-supporting surface of the component 102, which is generally described as being generally horizontal in relation to the direction of gravitational force. Stated differently, the surface 104 is effective to resist the movement of adhesive particulate as a result of gravitational forces. This orientation of surface 104 is in contrast to a non-horizontal surface, such as a midsole sidewall, which will be discussed in FIGS. 7 and 8 hereinafter.

A deposition member 106 is illustrated depositing or applying the adhesive particulate 202 onto the surface 104. The deposition member 106 is exemplary in nature and any manner of applying the adhesive particulate 202 is contemplated. For example, a pneumatic applicator, such as an air-powered sprayer, may apply the adhesive particulate such that the adhesive particulate is applied to non-horizontal surfaces in a relatively even manner, in an exemplary aspect. The deposition member 106 is intended to illustrate that a deposition member may apply the adhesive particulate 202 as it traverses or otherwise moves relative to the surface 104, such as in a heel-to-toe direction, a toe-to-heel direction, a lateral-to-medial direction, a medial-to-lateral direction, or a specific deposition pathway. Further, the deposition member 106 is depicted as depositing the adhesive particulate 202 across a substantial width of the surface 104 in the illustrated example; however, it is contemplated that the application of the adhesive particulate may be in a more focused or concentrated application, such as will be depicted at FIG. 3 hereinafter.

In an exemplary aspect, it is contemplated that a deposition member, such as an electrostatic powder applicator, may deposit the adhesive particulate as charged with an electrostatic charge. This application with a static charge may allow for the non-horizontal application and maintaining of the adhesive particulate until a subsequent selective fusing of the adhesive particulate occurs. Further, it is contemplated that the static charge reduces an amount of adhesive particulate that is not maintained on the surface, which leads to manufacturing efficiencies. It is contemplated in an exemplary aspect that a conductive fluid or other material that traditionally forms a grounded receptor for the electrostatically charged adhesive particulate to be attracted is not applied or otherwise used on the component. Instead, the component, such as a shoe sole portion, may be formed from a material that inherently serves as a sufficient ground to attract and maintain an electrostatically charged adhesive particulate. As such, efficiency in the manufacturing process may be achieved as a separate step of applying and curing a conducting fluid is not needed to still achieve sufficient attraction between the appropriately selected component material (e.g., a foamed material used to form a midsole) and the electrostatically charged adhesive particulate.

The adhesive particulate provided herein may be a powdered material in an exemplary aspect. For example, it is contemplated that the adhesive particulate is comprised of a thermoplastic polyurethane ("TPU"); an ethylene vinyl acetate ("EVA"); or a polyolefins material. The adhesive particulate may have a mesh size between 4 and 140, 20 and 100, or 70 and 90, in exemplary aspects. It is further contemplated that the adhesive particulate has a melting temperature in a range from 50 degrees Celsius to 130 degrees Celsius, as that is an operating temperature where a selected article of footwear components can receive the adhesive particulate and be fused, in an exemplary aspect. More particularly, it is contemplated that the melting temperature is 60 degrees Celsius to 90 degrees Celsius or 60 degrees Celsius to 80 degrees Celsius, in exemplary aspects, to achieve a desired manufacturability of concepts provided herein. The selection of an adhesive particulate may be dependent on a desired bonding strength, the component material, and/or a second article of footwear component material to which the component is to be bonded.

Depending on a material onto which the adhesive is to be bonded, it is contemplated that various temperature ranges may exist between the adhesive melt temperature and the melting point of the material onto which the adhesive is applied. For example, the range between the adhesive melting and the substrate (e.g., component onto which the adhesive is melted) may be less than 160 degrees Celsius. For example, if the substrate is a TPU or a Pebax (i.e., polyether block amide copolymer) that may have a melting point between 120 degrees Celsius and 220 degrees Celsius and the adhesive has a melting temperature between 60 and 80 degrees Celsius. Similarly, with the proposed ranges, the difference, in an exemplary aspect, between melting temperatures of the substrate and the adhesive may be as low as 40 degrees Celsius.

Additional substrate materials are contemplated. For example, a substrate that is a thermoset material that instead of melting at a given temperature will burn at the given temperature. Examples may include rubber (e.g., thermoset rubber having a sulfer or peroxide cured crosslink), cross-linked polyolefin foam (e.g., EVA, butane-based block copolymers, octane-based copolymers, mixtures thereof), thermoset polyurethane foam (e.g., polyester, polyether, polycaproloactone), or thermoset polyurethane elastomers (e.g., polyester, polyether, polycaprolactone). It is further contemplated that each of these materials may have a different hardness. For example, the thermoset rubbers and the thermoset polyurethane elastomer may have a hardness range of 55 to 75 Shore A. Also, it is contemplated that these substrate materials may have a density range. For example, the cross-linked polyolefin may have a density less than 0.35 g/cc and the thermoset polyurethane foam may have a density less than 0.40 g/cc, in an exemplary aspect. While specific material are listed and specific characteristics are also indicated, it is understood they are exemplary in nature and not limiting onto the application of aspects provided herein.

Subsequent to the depositing or application of the adhesive particulate 202 onto the surface 104 (or any surface), laser energy is selectively applied from a laser 108 to raise the temperature of the adhesive particulate to at least a melting temperature of the adhesive particulate. The laser 108 may be any type of laser so long as the adhesive particulate, the component, and the frequency/power of the laser are compatible to result in a fusing of the adhesive particulate and the component. For example, a CO2 laser having a 200 watt rating may be used with various settings adjusted based on the surface area to be covered, the type of adhesive particulate, and the material forming the component. The speed, power, frequency, fill gap, and wobble may all be adjusted on an exemplary system effective for selectively applying laser energy. Further, it is contemplated that the laser may be a diode laser producing energy in the near infrared ("NIR") spectrum, such as around 980 nm. The selection of a laser in the NIR spectrum may allow for the selective and preferential heating of one material over another. For example, it is contemplated that a doping agent effective in the NIR spectrum may be included with the adhesive particulate to enhance the thermal energy generation from a given laser energy as perceived by the doped adhesive particulate. This doping agent may allow for an increased absorption of energy and differentiated heating of the component and the adhesive particulate as needed to achieve different melt temperatures to accomplish fusing/bonding. It is contemplated that the laser may operate in the 800 nm to 2,000 nm frequency range in an exemplary aspect to achieve a desired application of laser energy.

A selective application of laser power may be achieved by specifically positioning the laser energy 110 (e.g., a laser beam) at a desired sequence of locations to generate a particular geometric form, such as a hash pattern generally depicted in FIG. 1. The selective application of laser energy is contrary to the generic application of thermal energy to the adhesive particulate as a whole, but instead, only certain portions of the adhesive particulate are exposed to the laser energy. Stated differently, the selectively applying laser energy allows for a specific geometric configuration to be formed as a fused portion within the greater collection of deposited adhesive particulate. This specific geometric configuration may optimize the position, quantity, and resulting effect of the adhesive particulate when used as a bonding agent with another component.

An example of selectively applying laser energy may include directing the laser energy to form a perimeter on a midsole sidewall such that adhesive particulate is fused on the midsole sidewall to form an appropriate bonding layer near a bite line on an upper. Stated differently, it is contemplated that laser energy may be selectively applied to form a perimeter (which does not necessarily extend the entire perimeter of the midsole), such as a 50 millimeter to a 3 centimeter wide structure, that is effective to bond the sidewalls of a midsole to an upper. Also contemplated in addition to or in the alternative of the substantial perimeter is a geometric structure formed by selectively applying laser energy to a foot-supporting surface of a midsole. The geometric structure may be formed such that portions of unfused adhesive particulate are substantially bounded (e.g., surrounded on edges) by fused adhesive particulate. A non-limiting example of a bounded geometric configuration includes the depicted hash configuration formed by fused region 206 bounding unfused regions 204, as will be discussed hereinafter. Other geometric structures are also contemplated with the selective application of laser energy, such as organic structures and repeating patterns. A selectively applied laser energy formed structure is one that is formed based on input and instructions provided by a computing system to apply specific laser energy to a defined first location while intentionally avoiding applying laser energy to a second location on the component.

The selective application of laser energy to the adhesive particulate may be used to create a number of geometric configurations of fused and unfused adhesive powder areas. For example, it is contemplated that in a linear direction of travel for a laser a first portion on the continuous direction of travel may be fused with laser energy, a subsequent portion of the linear direction of travel is not fused (e.g., insufficient or no laser energy is applied), and finally another portion along the same linear direction of travel is fused by selective application of laser energy. As such, the selective application of laser energy to the adhesive powder is effective to form regions of fused and unfused adhesive powder that results in area having adhesive bonded thereto and areas not having adhesive bonded thereto that could not be achieved without selective application of laser energy.

The selective application of laser energy may be accomplished by a computer-controlled motion mechanism mechanically coupled with the laser, such as an X-Y gantry system. Additionally, it is contemplated that selective application of laser energy may be accomplished with a mirror galvanometer to effectively direct laser energy at specified locations to achieve a selectively formed fused adhesive particulate region. Regardless of the system implemented to specifically direct a laser energy beam, it is contemplated that a computing system having computer-executable instructions embodied on a computer-readable media is effective to control the directing mechanism to effectively and selectively fuse the adhesive particulate based on predefined instructions for location, power, speed, wobble, frequency, and other adjustable factors associated with the directing mechanism and the laser.

The specific directing of the laser energy along with control over the power, speed, wobble, and frequency, as contemplated in aspects hereof, provides an ability to selectively apply the hot-melt adhesive that is superior to alternative methods of applying a hot-melt adhesive. For example, some systems may rely on the application of a conductive liquid to a to-be-bonded component and a charged hot-melt adhesive particulate that is electrostatically drawn to the conductive liquid, which does not enable an efficient opportunity to selectively locate the adhesive particulate other than through manipulating the application of a conductive liquid onto the component, which may not allow for specific geometric structures to be formed from the adhesive particulate nor a desired level of control of the resulting structure to occur. An alternative method of applying a coating on a substrate uses a scanning laser beam on the surface of the substrate to heat the substrate to a sufficient temperature that subsequently melts the hot-melt adhesive without having direct interaction of laser energy to the hot-melt adhesive. This example contemplates using the energy from the laser to heat the substrate surface to a sufficient temperature such that when a powdered material is deposited on the substrate, the powdered material melts without having direct receipt of laser energy. As such, the substrate is heated to a temperature sufficient for the later deposit of powder to melt on the substrate from the residual thermal energy. The heating of the substrate and the lack of selective fusibility of an adhesive particulate fails to provide desired efficiencies needed for the manufacturing of articles of footwear, such as selectively fused adhesive particulates to non-metallic substrates, in an exemplary aspect.

As depicted in FIG. 1, subsequent to the deposition of the adhesive particulate, the laser 108 and a selectively directed laser energy 110 fuse portions of the adhesive particulate together and with the component 102, in this example. While the directed laser energy 110 is depicted as a uniform laser application in FIG. 1, in reality the laser energy 110 may be a focused beam having geometric characteristics (e.g., size, shape) effective for fusing an appropriate amount of adhesive particulate. The resulting fused region 206 extends across one or more surfaces of the component 102 forming what may eventually be a bonding structure to bond the component 102 with another component. Because the laser energy 110 is selectively applied, a portion of the adhesive particulate that is not increased in temperature to a melting temperature by the laser energy 110 remains in an unfused (e.g., particulate configuration that has not bonded with neighboring particles through a fusing processes by the elevation to at least a melting temperature) configuration, as represented by the unfused regions 204. The unfused regions 204, in this example, are bounded between the fused regions 206; however, in alternative aspects the unfused regions 204 may be unbounded by a fused region.

Figure 2:
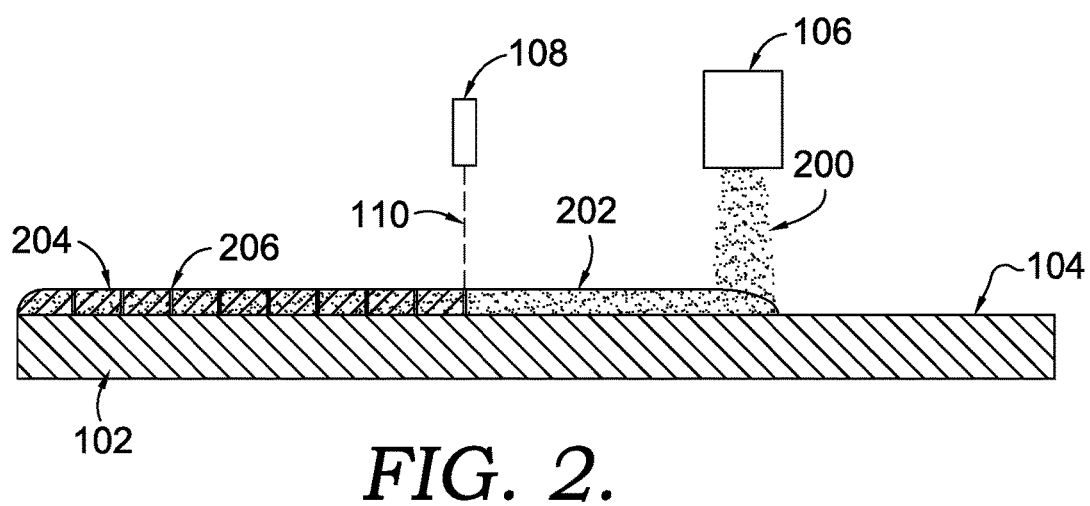
FIG. 2 depicts a cross-sectional view along line 2-2 of FIG. 1, in accordance with aspects of the present invention.

FIG. 2 depicts a cross-sectional view along line 2-2 of FIG. 1, in accordance with aspects of the present invention. The component 102 is depicted extending from a heel end toward a tow end. The deposition member 106 is depicted depositing the adhesive particulate 202 as free-flowing powder 200 that is deposited by gravity, pressure, or aided with electrostatic adhesion as the deposition member 106 traverses the component 102 from the heel end towards the toe end. The thickness of the deposited adhesive particulate 202 may be any thickness, such as 1 to 3 millimeters in thickness. It is contemplated that the thickness of deposited materials may be varied at different locations of the component onto which the material is applied. This difference in thickness may achieve different eventual bonding characteristics of the adhesive particulate to achieve functional advantages.

The laser 108 is projecting laser energy 110 at a particular location on the component 102 to selectively fuse the adhesive particulate at that location while leaving adhesive particulate in an unfused state at locations not thermally targeted by the laser energy. As such, fused region 206 is depicted within the adhesive particulate similar to the unfused region 204.

As previously discussed, it is contemplated that any geometric structure of fused and unfused adhesive particulate may be formed from the selective application of laser energy that causes the fusing of the adhesive particulate. Further, as will be depicted in FIGS. 3 and 4, it is contemplated that various application techniques, apparatus, and methods may be utilized to selectively fuse and apply the adhesive particulate. As also previously discussed, it is contemplated that electrostatic application techniques may be implemented to broadly apply or to selectively apply the adhesive particulate, in an exemplary aspect.

Figure 3:
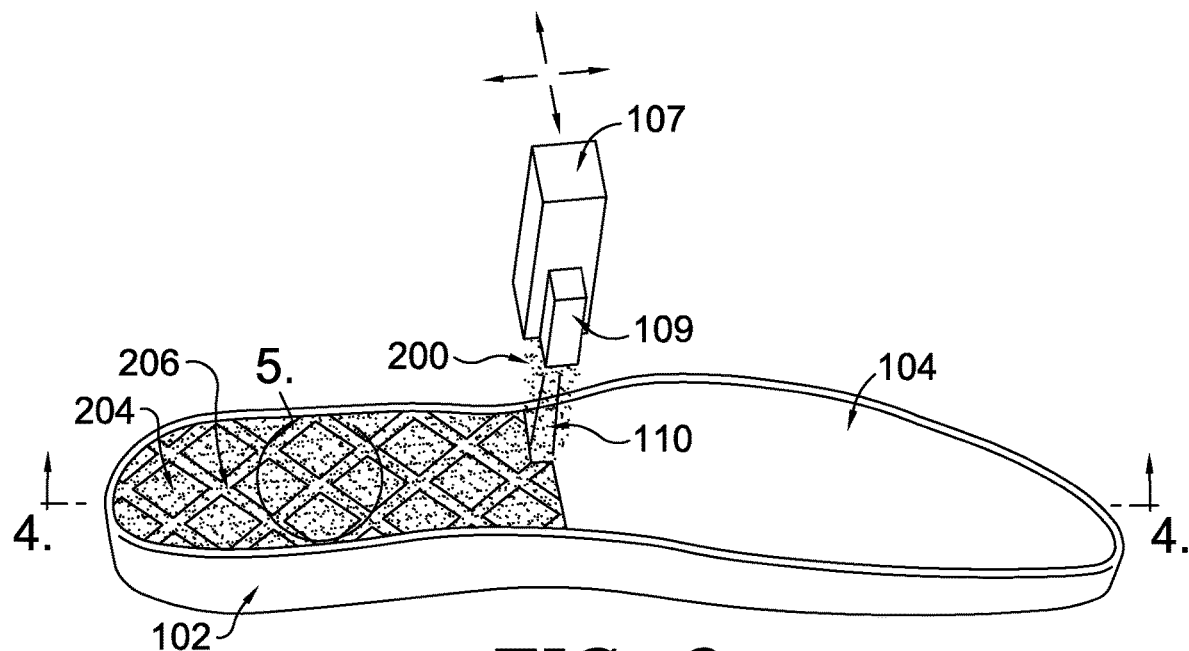
FIG. 3 depicts an exemplary process that is similar to FIG. 1 where the component for an article of footwear receives a selective laser energy applied thereon to selectively fuse adhesive particulate, in accordance with aspects hereof.

FIG. 3 depicts an exemplary process that is similar to FIG. 1 where the component 102 for an article of footwear receives a selective laser energy 110 applied thereon to selectively fuse free-flowing powder 200, which may also be referred to as adhesive particulate 200, in accordance with aspects hereof. However, in FIG. 3, the laser 109 is in coordinated motion with the deposition member 107 such that the application of adhesive particulate and selective application of laser energy are a near contemporaneous process, as an alternative option for aspects provided herein.

The laser energy 110 is effective to fuse the adhesive particulate 200 to the component 102 such that a physical bond and/or chemical bonds are formed there between. This process ensures that an adhesive for bonding two or more components together is applied in a proper location and in an optimized geometric structure. As will be discussed hereinafter, the fused adhesive particulate may subsequently be heated or otherwise activated to again raise the adhesive particulate to at least a melting temperature such that the component onto which the adhesive particulate is fused is functionally bonded with a second component as the adhesive particulate solidifies in contact with the first and second components.

Figure 4:
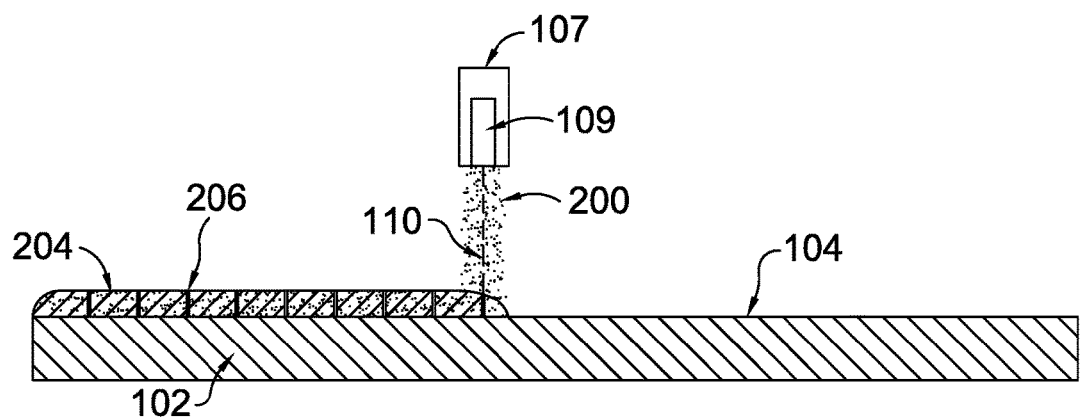
FIG. 4 depicts a cross-sectional view along line 4-4 of FIG. 3, in accordance with aspects hereof.

FIG. 4 depicts a cross-sectional view along line 4-4 of FIG. 3, in accordance with aspects hereof. As the adhesive particulate 200 is applied to the surface 104, laser energy 110 from the laser 109 selectively fuses the adhesive particulate together and to the component 102 resulting in a desired geometric structure of fused adhesive particulate, such as the fused region 206. Because the laser energy is selectively applied, portions of the adhesive particulate remain unfused for subsequent removal from the surface 104, such as unfused region 204.

Figure 5:
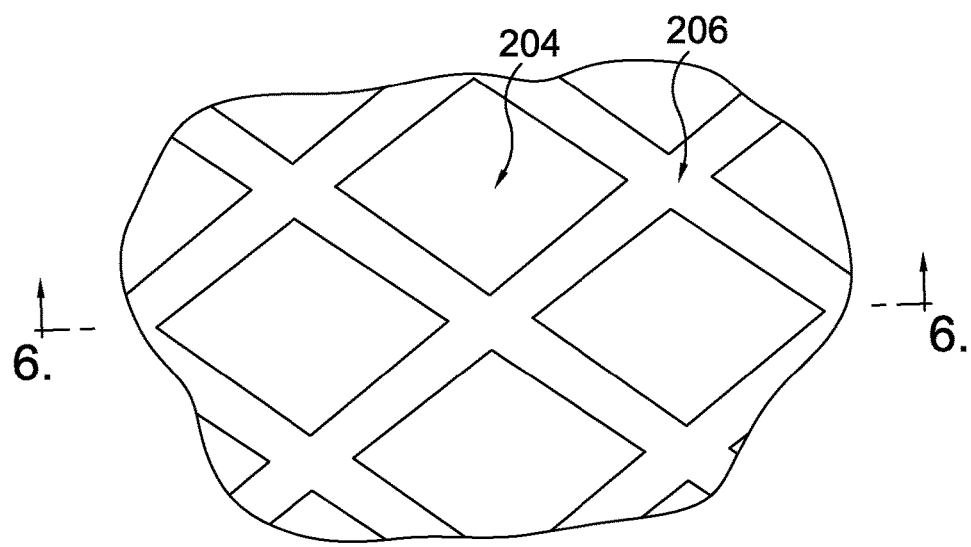
FIG. 5 depicts a focused view as identified in FIG. 3 as focus region 5, in accordance with aspects hereof.

FIG. 5 depicts a focused view as identified in FIG. 3 as focus region 5, in accordance with aspects hereof. In particular, the fused region 206 represents a hatch-like geometric structure that is effective to at least partially surround the unfused region 204. Because the selective application of laser allows some portions of the adhesive particulate to remain unfused while fusing other regions, the unfused portions may be recycled for later application to a component. Also, because the application of the adhesive particulate may be performed with the addition of agents or other chemicals to provide a temporary bond prior to fusing, those additional agents and/or chemicals do not affect the recyclability of the unfused adhesive particulate.

Figure 6:
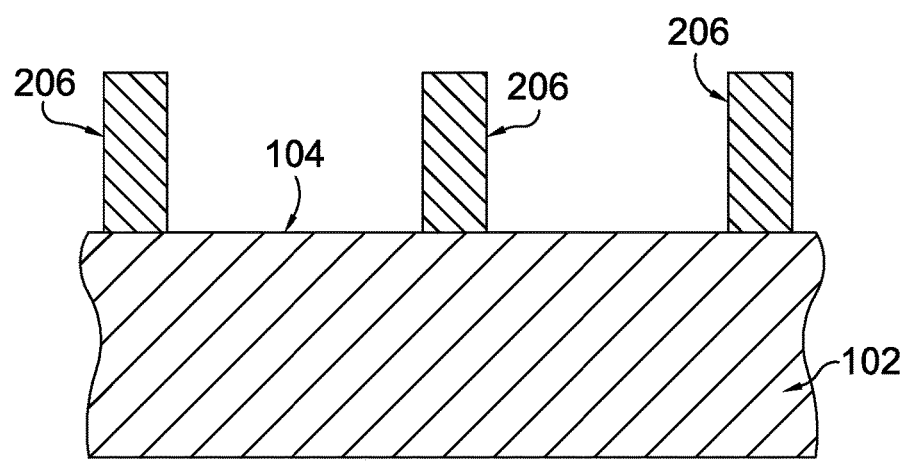
FIG. 6 depicts a cross-sectional view along line 6-6 of FIG. 5, in accordance with aspects hereof.

FIG. 6 depicts a cross-sectional view along line 6-6 of FIG. 5, in accordance with aspects hereof. In this example, the unfused portions of the adhesive particulate have been removed to expose the fused regions 206. As such, the adhesive particulate is fused to the component 102 such that it forms a coupled geometric structure on the surface 104. The geometric structure of fused adhesive particulate may extend above the surface 104 a defined height, such as 1-3 mm. Further, the width or other geometric configuration may be adjusted to provide varied levels of adhesive particulate to achieve a desired level of bonding between components.

As previously provided, the fused adhesive particulate on a first component, such as a sole, is used for the subsequent bonding of that component with another component, such as a shoe upper. Therefore, the selective application of laser energy allows for the resulting selective positioning of adhesive particulate for eventual use in bonding two or more components. While the adhesive particulate has been discussed as a thermoform type material that can pass through multiple state changes (e.g., solid to liquid to solid to liquid), it may be desired in some aspects to add an agent (e.g., crosslinking agent) to result in a thermoset material (e.g., a reactive hot-melt adhesive).

However, if a process is implemented in which the adhesive particulate is heated for purposes of forming the geometric structures prior to application of a second component, if the crosslinking agent is introduced prior to this initial application of laser energy, the adhesive particulate would not be suitable for future heating to achieve a bond between the two components. Therefore, in an exemplary aspect, if a crosslinking agent is to be introduced to a thermoplastic material, the crosslinking agent is introduced after forming the adhesive particulate geometric structure. An example of a crosslinking agent may include an encapsulated isophorone diisocyanate ("IPDI") trimer. A crosslinking agent may be applied as a water-based dispersion that is dried on the fused adhesive particulate at a temperature that is below an activation temperature of the agent. Therefore, once the fused adhesive particulate having been treated with the crosslinking agent is heated above the activation temperature and the melting temperature, crosslinking may commence and heat resistance will be affected to the bonding margins between the component(s) and the adhesive particulate. It is further contemplated that a localized surface variation (e.g., increased surface area, porosity, roughness) may be introduced to allow for a more homogeneous distribution of the crosslinking agent (e.g., a hardener) into the fused adhesive particulate.

Figure 7:
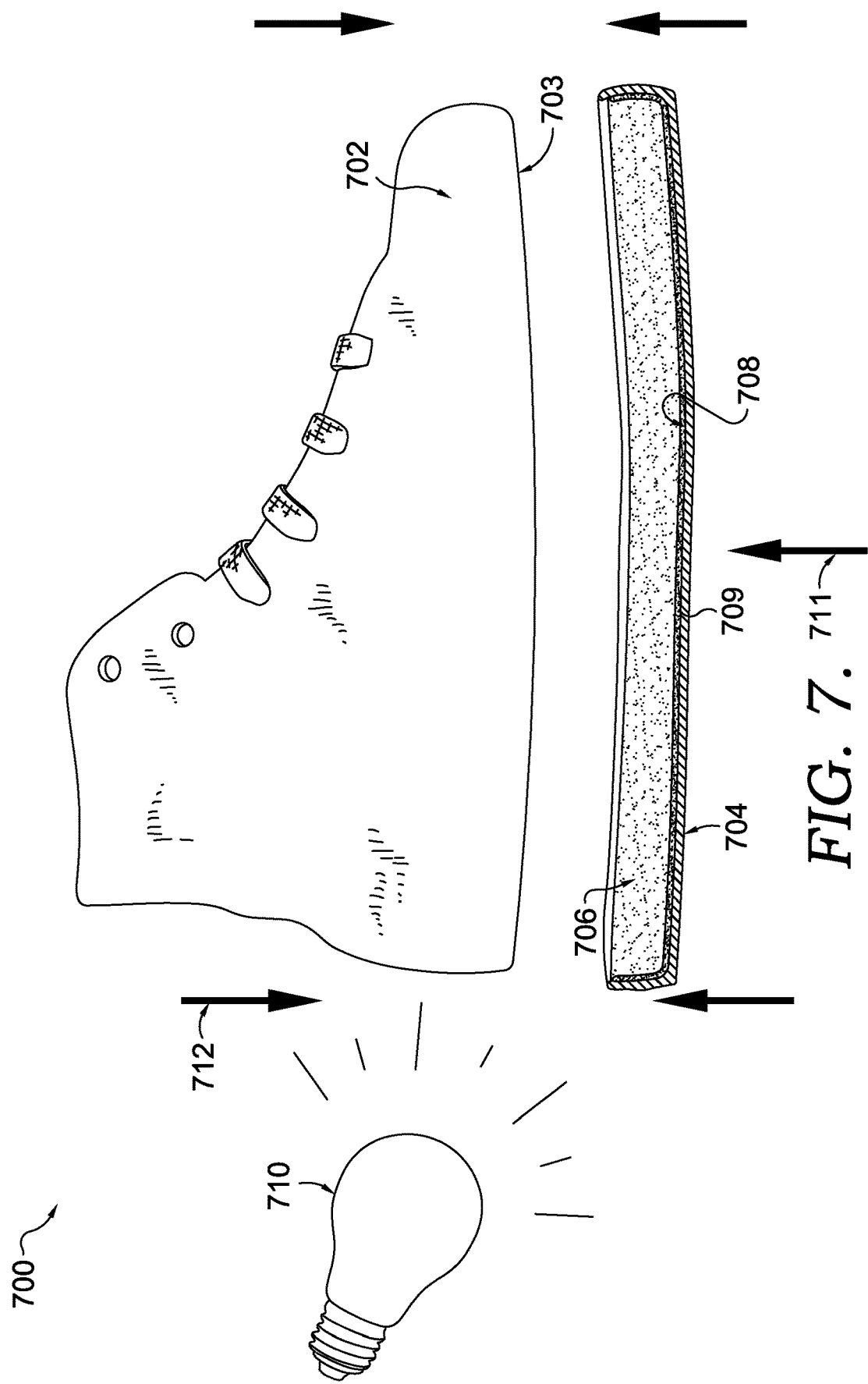
FIG. 7 illustrates a sole component having fused adhesive particulate, which is depicted being activated prior to being mated with an upper component, in accordance with aspects hereof.
Figure 8:
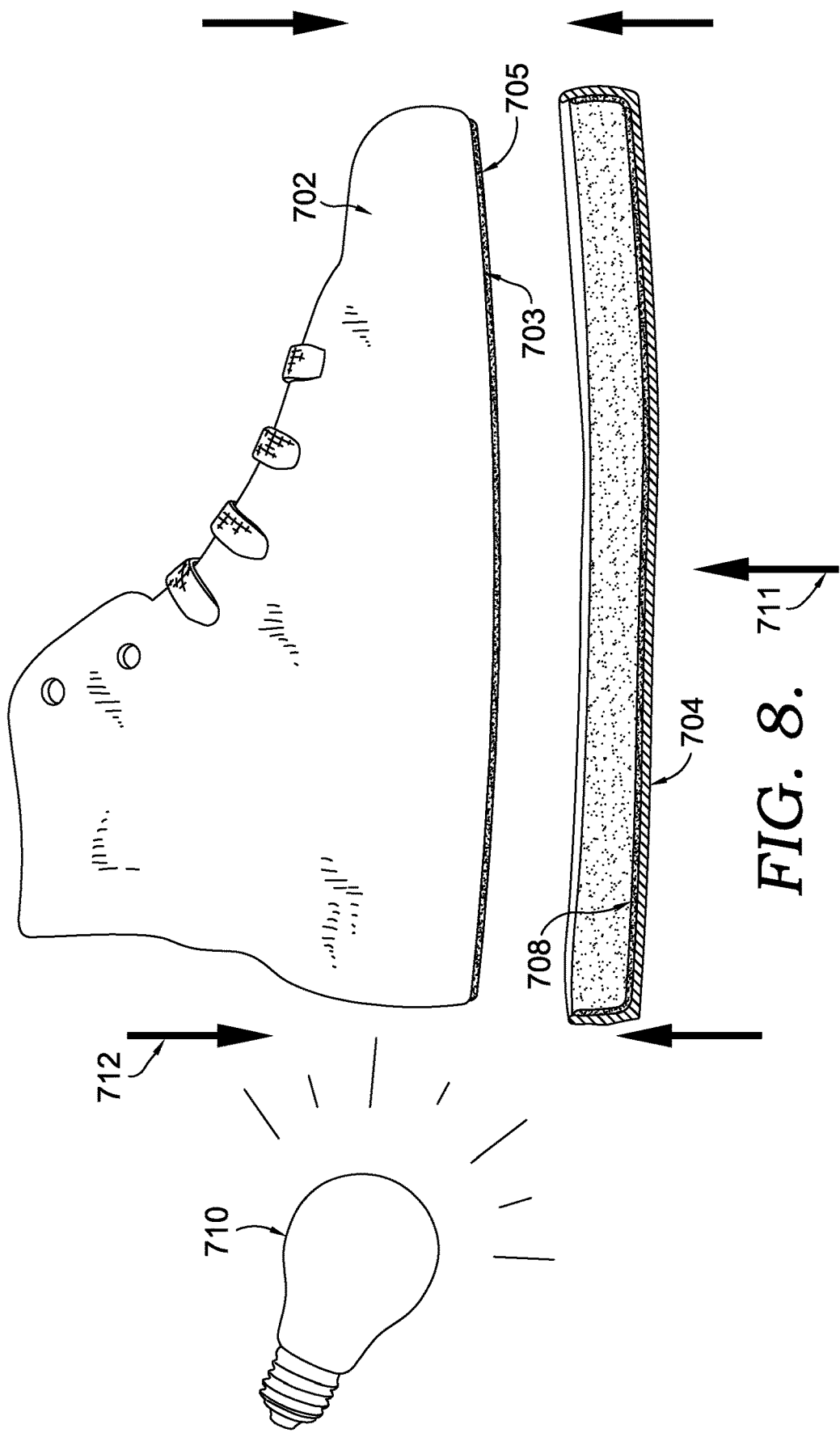
FIG. 8 depicts a second example of the upper component and the sole component receiving a thermal energy prior to being mated, in accordance with aspects hereof.
Figure 9:
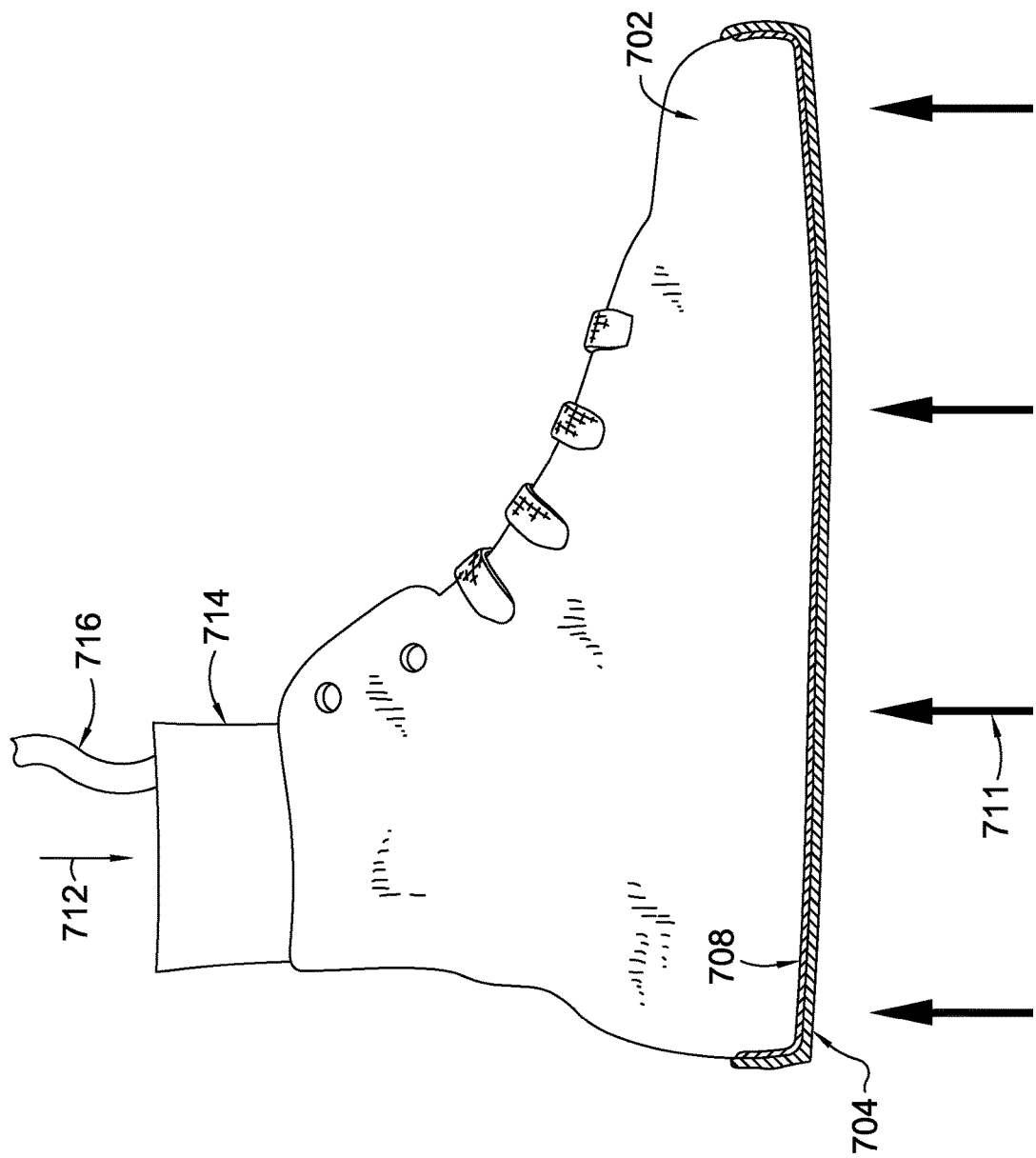
FIG. 9 depicts an alternative method of activating fused adhesive particulate for bonding the upper component and the sole component, in accordance with aspects hereof.

FIGS. 7-9 illustrate non-limiting examples for a subsequent activation of the fused adhesive particulate for purposes of bonding the component (e.g., shoe sole) with a second component (e.g., shoe upper). A cross-section of one or more components (e.g., sole component, adhesive particulate layer) is illustrated in FIGS. 7-9 for discussion and exemplary purposes.

A first general technique will be illustrated in FIGS. 7 and 8 in which it is contemplated that a flash activation, such as by infrared light, may be used to elevate the fused adhesive particulate to a substantial temperature (e.g., melting temperature). At which point the to-be-bonded components are mated together (e.g., brought together under a sufficient pressure) until the adhesive particulate has recrystallized. A second contemplated activation technique, which will be illustrated in FIG. 9 hereinafter, contemplates first mating the to-be-bonded components and then heating the fused adhesive particulate to a sufficient temperature after which the pressure is maintained until the temperature can be brought back down below a crystallization temperature of the adhesive particulate.

Turning specifically to FIG. 7, a sole component 704 having fused adhesive particulate 708 is depicted being activated prior to being mated with an upper component 702, in accordance with aspects hereof. As previously discussed, it is contemplated that a thermal energy-providing source may be used to increase the temperature of the fused adhesive particulate to a sufficient temperature that the fused adhesive particulate may serve as an adhesive between the sole component 704 and the upper component 702 when mated and maintained with pressure until the fused adhesive particulate recrystallizes.

The thermal energy source may be any suitable energy source. In an exemplary aspect, the thermal energy source may be an infrared emitter 710 that emits energy in a frequency sufficient to generate thermal energy at the fused adhesive particulate 708. While a single infrared emitter 710 is depicted, it is understood that any number, combination, type, style, frequency, and the like may be implemented to achieve a thermal energy source suitable for aspects provided herein. In this example, once the fused adhesive particulate 708 that is on the sole component 704 at both a horizontal surface, such as a foot-facing surface 709, and a sidewall interior surface 706 is activated, the sole component 704 and the upper 702 are mated together with forces 712 and/or 711. The components may be maintained in a compressed relationship for a sufficient time to allow the fused adhesive particulate to cool and recrystallize forming a bond between the sole component 704 and the upper component 702, in an exemplary aspect. Because the components are brought into contact after activation of the fused adhesive particulate, the fused adhesive particulate may be selected to have a slower recrystallization rate allowing the components to be brought into a mated configuration prior to recrystallizing, in an exemplary aspect.

In the example of FIG. 7, the fused adhesive particulate 708 is only provided on one component, the sole component 704. The upper component 702 is free of the fused adhesive particulate prior to being placed in a mated configuration. Therefore, the bonding between the sole component 704 and the upper component 702 is dependent, in this example, on the fused adhesive particulate 708 of the sole component 704. A bottom surface 703 of the upper component 702 is brought into contact with the sole component 704 allowing for the fused adhesive particulate 708 to bond the components together, in this example.

Also depicted in this example, the fused adhesive particulate 708 extends up the non-horizontal sidewall 706 of the sole 704. Therefore, unlike planar application of powdered materials, aspects contemplate multi-surface application of the adhesive particulate for fusing. By providing the adhesive particulate on the sidewall 706, the sole component 704 may be bonded with the upper component up to a bite line, an intersection between the sole sidewall top edge and the upper 702. Therefore, a subsequent adhesive application or additional bonding technique may be avoided in the manufacturing of an article of footwear by allowing the fused adhesive particulate to extend across both horizontal and non-horizontal surfaces, in exemplary aspects.

FIG. 8 depicts a second example of the upper component 702 and the sole component 704 receiving a thermal energy prior to being mated, in accordance with aspects hereof. In the illustrated example of FIG. 8, the upper component 702 has applied thereon a fused adhesive particulate layer 705. The fused particulate layer 705 may be formed from a similar adhesive particulate as that forming the fused particulate layer 708 applied to the sole component 704. While a single infrared emitter 710 is depicted, it is understood that any number, combination, type, style, frequency, and the like may be implemented to achieve a thermal energy source suitable for aspects provided herein.

It is contemplated that multiple thermal energy sources emitting energy at various angles may be implemented to achieve a relatively homogeneous thermal energy generation across the various adhesive particulate portions. It is contemplated that having the fused adhesive particulate located on both the upper component 702 and the sole component 704 may provide, for some materials forming one or more components, a more consistent and complete bond between the components, for example. However, in some aspects having different materials and/or components, a single application of adhesive particulate may be sufficient to achieve a desired bond.

FIG. 9 depicts an alternative method of activating fused adhesive particulate for bonding the upper component 702 and the sole component 704, in accordance with aspects hereof. In this example, the components are mated together under pressure (e.g., pressure 711 and 712) prior to re-activating (e.g., taking to a non-crystalline state) the fused adhesive particulate. A heat-inducing element, such as a thermally variable last 714 may then heat one or more of the components, such as the upper component 702 in this example. The heating of the component then causes the fused adhesive particulate 708 to elevate in temperature sufficiently to bond the components. The thermally variable last 714 may be heated using a number of different mechanisms. For example, an energy supply member 716 may provide hot liquid or electrical current for peltier devices, internal induction devices, resistive heating devices, polymide heating devices, and the like. The heat generated by or in the energy supply member 716 is sufficient to raise a temperature of the adhesive particulate to a melting temperature allowing for the bonding of the components.

Figure 10:
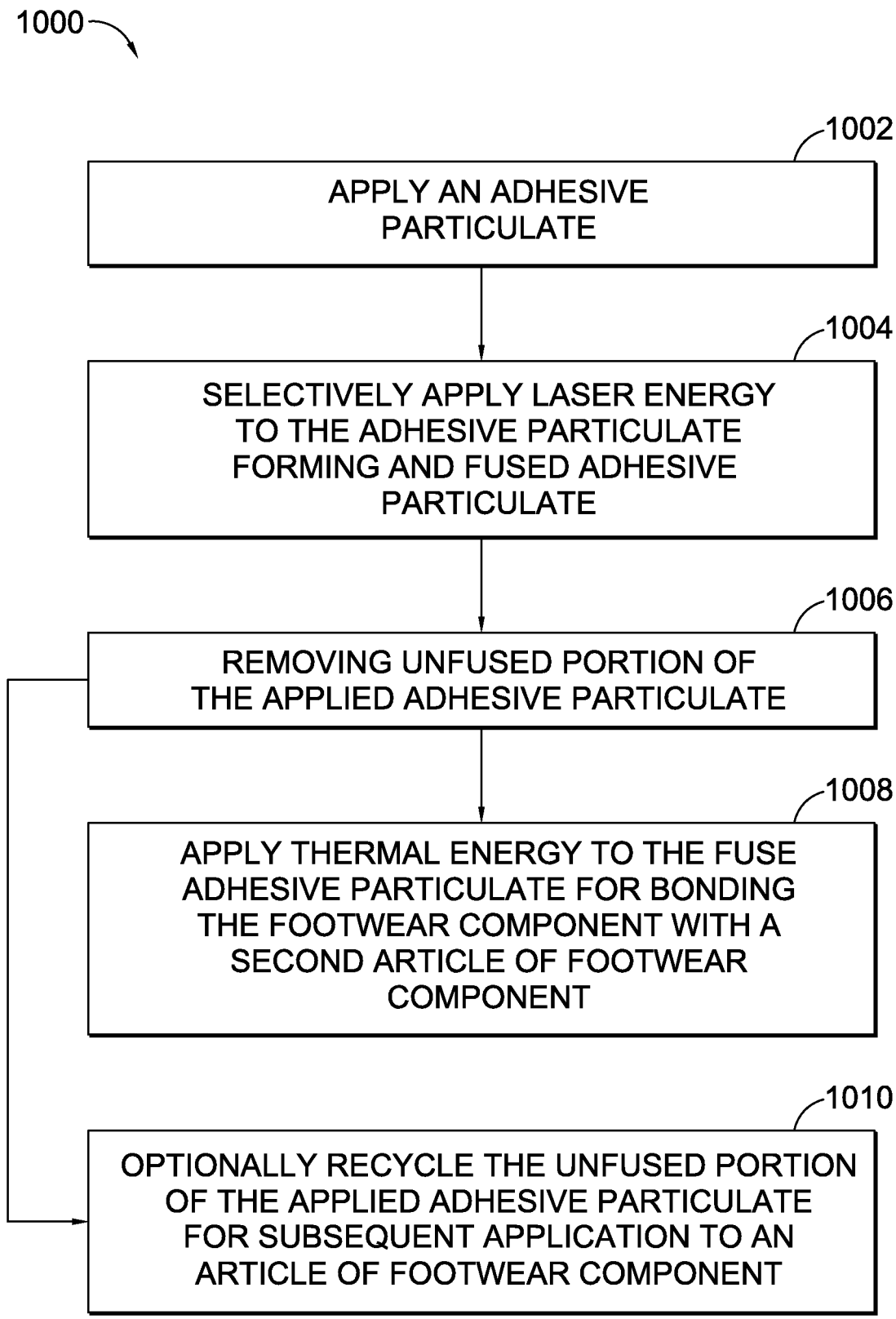
FIG. 10 illustrates a representation of a method for applying an adhesive particulate to an article of footwear component, in accordance with aspects hereof.

FIG. 10 illustrates a representation of a method 1000 of applying an adhesive particulate to an article of footwear component, in accordance with aspects hereof. At a block 1002, an adhesive particulate is applied to a component. As previously discussed, it is contemplated that the particulate may be deposited by gravity, pressure, electrostatic adhesion, or any suitable means. Unlike some application techniques that rely on a conducting agent to achieve electrostatic adhesion, a conducting agent may not be applied to the component in an exemplary aspect. Instead of relying on a conducting agent, the material from which the component is formed serves as a sufficient ground to achieve a desired degree of electrostatic adhesive for the eventual fusing operation to be performed, in an exemplary aspect. It is further contemplated that primer may be applied to the component to achieve a stronger bond between the adhesive particulate and the component. The primer may be an ultraviolet activated primer that produces a sufficient bonding surface onto which the adhesive particulate may be fused, in an exemplary aspect.

As discussed previously, it is contemplated that the adhesive particulate may be a dry or liquid material. In an exemplary aspect, the adhesive particulate is a powdered adhesive, such as TPU, EVA, or a polyolefins material, at least in part. The adhesive particulate may also be comprised of a doping agent that allows for varied responses to one or more energy sources. For example, an infrared doping agent may be included in the adhesive particulate that aids in the thermal response to an infrared energy source. The adhesive particulate may have a melting temperature ranging between 50 and 130 degrees Celsius. It is further contemplated that the melting temperature is in a range of 60 to 90 degrees Celsius, in an exemplary aspect.

At a block 1004, laser energy is selectively applied to the adhesive particulate. The adhesive particulate affected by the laser energy is increased in temperature sufficiently to fuse and bond with the underlying component. The sufficient temperature is at or above the melting temperature of the adhesive particulate, in an exemplary aspect. The fused adhesive particulate forms a geometric structure, a fused region, that is selected to result in an appropriate quantity of the adhesive particulate at a desired location to achieve a desired bonding between two components. For example, it is contemplated that through the selective application of laser energy, a band of fused adhesive particulate may extend around an inner sidewall up to near a top edge to securely bond the sole to an upper at the bite line. Similarly, a foot-supporting surface of a sole may have a geometric pattern, such as a bounded structure, that provides consistent or relatively uniform distribution of adhesive particulate without requiring a complete surface covering of the adhesive particulate. In this example, it is contemplated that a precise application of adhesive particulate may be achieved through the selective application of laser energy, such that depending on some component size, style, and shape, a predetermined amount and coverage of fused adhesive particulate is achieved.

The selective application of laser energy may include applying laser energy in a first location and omitting laser energy in a second location. The omission may be accomplished by blocking the laser energy or eliminating power to the laser. Regardless, where the laser energy is provided, a fusing of the adhesive particulate may occur, and where the laser is not applied, the adhesive particulate remains as a free-flowing particulate, in an exemplary aspect. Similarly, it is contemplated that a frequency, speed, or power level of the laser may be adjusted to alter whether the adhesive particulate achieves a melting temperature (e.g., fuses) or does not melt in a given location.

At a block 1006, unfused adhesive particulate is removed from the component. Unfused adhesive particulate is adhesive particulate that was not elevated for a sufficient time to a sufficient temperature to fuse with at least the underlying component. The unfused material may be removed by gravity, compressed fluids, vacuum, or other removal techniques. In an exemplary aspect, because a crosslinking agent was not used prior to application of the laser energy, the unfused material may be recycled for subsequent operations.

At a block 1008, thermal energy is applied to the fused regions of the adhesive particulate. The thermal energy may be provided by an energy emitter, such as an infrared light source, or it may be provided by a conductive member, such as a thermally regulated last, in an exemplary aspect. This application of thermal energy elevates a temperature of the fused adhesive particulate sufficiently to achieve a melting temperature state transition that allows the adhesive particulate to serve as a bonding agent between two components. It is also contemplated that a crosslinking agent may be introduced to result in a thermoset material such that a subsequent application of heat is less likely to result in a loss of bond between the two components. In the example having a crosslinking agent included, the temperature may be raised in the range of 60 degrees Celsius and 80 degrees Celsius, in an exemplary aspect. In an example where a crosslinking agent has not been specifically added, the temperature of the adhesive particulate may be raised to a temperature range between 80 degrees Celsius and 110 degrees Celsius, in yet another exemplary aspect. The use of a crosslinking agent may depend on the characteristics of the substrate onto which the adhesive particulate is fused. For example, if physical characteristics or chemical characteristics of the substrate are affected by the higher temperature range used in an exemplary heating of a non-crosslinking added adhesive particulate, the lower temperature range of the cross linking laced adhesive particulate may be implemented, for example.

A block 1010 represents an optional step of recycling the unfused portion of the adhesive particulate for a subsequent application to another article of footwear component. As previously provided, it is contemplated that the adhesive particulate is useable in a subsequent operation as it is a thermoform material that may be brought to a melting temperature to fuse or bond with one or more components. While specific examples in FIG. 10 are directed to articles of footwear, it is contemplated that the method steps are applicable to other fields, articles, and industries, as provided herein and discussed hereinafter.

While exemplary aspects are provided herein with a focus on implementation in connection with an article of footwear, it is understood that features specifically and the concept generally may be applied to a variety of implementations. For example, the automotive, aeronautical, light industrial, heavy industrial, electronic manufacturing, nautical applications, communications, and the like may all leverage concepts provided herein. As such, it is contemplated that the illustrated examples directed to an article of footwear may not be limiting but merely exemplary in nature in some aspects.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A nonmetallic component, the component comprising:
   the component having a component surface;
   an adhesive particulate contacting the component surface; and
   the adhesive particulate forming a fused region and a second unfused region, wherein laser energy is selectively applied at a sufficient level to the adhesive particulate to fuse the adhesive particulate with the component in the fused region and wherein laser energy is selectively applied at an insufficient level to the adhesive particulate so that the adhesive particulate is not fused with the component in the unfused region, the fused region forming a perimeter enclosing the unfused region on the component surface.

2. The component of claim 1, wherein the component is one of an article of footwear sole portion or an upper portion.

3. The component of claim 1, wherein the component is formed from a material having a melting temperature within 150 degrees Celsius of a melting temperature of the adhesive particulate.

4. The component of claim 1, wherein the fused region forming the perimeter enclosing the unfused region is between 50 millimeters and 3 centimeters wide.

5. The component of claim 1, wherein the component is formed from a material selected from:
   a thermoset material; or
   a thermoform material.

6. The component of claim 5, wherein the thermoset material is one of rubber, cross-linked polyolefin foam, thermoset polyurethane foam, and thermoset polyurethane elastomers.

7. The component of claim 1, wherein the adhesive particulate is comprised of at least one selected from the following:
   a thermoplastic polyurethane ("TPU");
   ethylene vinyl acetate ("EVA"); and
   polyolefins.

8. The component of claim 7, wherein the adhesive particulate is further comprised of an infrared doping agent.

9. The component of claim 7, wherein the adhesive particulate has a state change between 60 degrees Celsius and 80 degrees Celsius.

10. A footwear component, the footwear component comprising:

the component having a foot-facing surface and comprising one of rubber, cross-linked polyolefin foam, thermoset polyurethane foam, and thermoset polyurethane elastomers;

an adhesive particulate contacting the component surface; and the adhesive particulate forming a fused region and a second unfused region, wherein laser energy is selectively applied at a sufficient level to the adhesive particulate to fuse the adhesive particulate with the component in the fused region and wherein laser energy is selectively applied at an insufficient level to the adhesive particulate so that the adhesive particulate is not fused with the component in the unfused region, the fused region forming a perimeter enclosing the unfused region on the component surface.

11. The footwear component of claim 10, wherein the adhesive particulate is comprised of a powdered adhesive.

12. The footwear component of claim 11, wherein the powdered adhesive is comprised of at least one selected from the following:
a thermoplastic polyurethane ("TPU");
ethylene vinyl acetate ("EVA"); and
polyolefins.

13. The footwear component of claim 10, wherein after the selective application of laser energy, the unfused adhesive particulate in the unfused region is removed.

14. The footwear component of claim 13, wherein a crosslinking material is applied to the fused adhesive particulate subsequent to removing the unfused adhesive particulate.

15. The footwear component of claim 13, wherein thermal energy is applied to the fused region for bonding the footwear component with a second substrate subsequent to removing the unfused adhesive particulate.

* * * * *